United States Patent [19]

McLyman

[11] 3,792,399

[45] Feb. 12, 1974

[54] BANDED TRANSFORMER CORES

[75] Inventor: Colonel William T. McLyman, Lakewood, Calif.

[73] Assignee: The United States of America as represented by the Administrator of the National Aeronautics and Space Administration, Washington, D.C.

[22] Filed: Aug. 28, 1972

[21] Appl. No.: 284,245

[52] U.S. Cl. .................................. 336/210, 100/8
[51] Int. Cl. ............................................. H01f 27/26
[58] Field of Search ....... 336/210; 24/286, 20 S, 20, 24/256, 257; 100/8; 310/217

[56] References Cited
UNITED STATES PATENTS

| 2,523,071 | 9/1950 | Somerville | 336/210 X |
| 2,780,785 | 2/1957 | Ford | 336/210 |
| 427,132 | 5/1890 | Toomey | 24/286 |
| 911,840 | 2/1909 | Reid | 24/286 |
| 1,383,134 | 6/1921 | Lungren | 24/286 |
| 1,155,646 | 10/1915 | D'Arcy | 24/286 |
| 1,036,324 | 8/1912 | Denny | 24/286 |

Primary Examiner—Thomas J. Kozma
Attorney, Agent, or Firm—Monte F. Mott; John R. Manning; Wilfred Grifka

[57] ABSTRACT

A banded transformer core formed by positioning a pair of mated, similar core halves on a supporting pedestal, encircling the core halves with a strap, selectively applying tension thereto, whereby a compressive force is applied about the periphery of the core for reducing the innate air gap between the core halves, and welding the strap at a cruciform joint. A d.c. magnetic field is employed in supporting the core halves during initial phases of the banding operation, while an a.c. magnetic field subsequently is employed for detecting dimension changes occurring in the air gaps as tension is applied to the strap.

6 Claims, 11 Drawing Figures

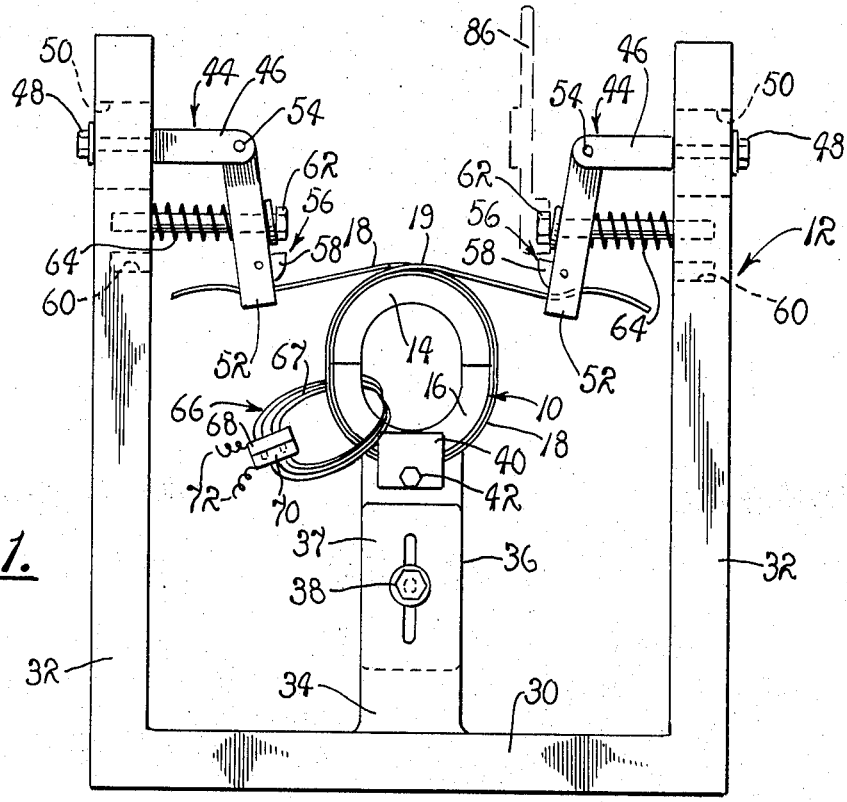
Fig.1.
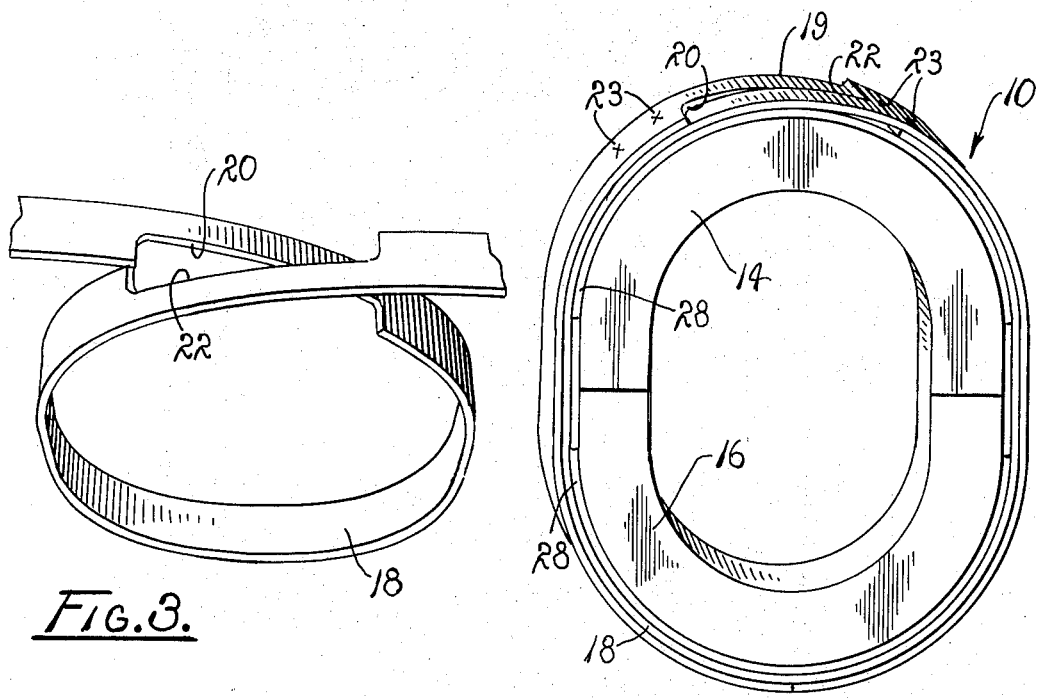
Fig.3.
Fig.2.

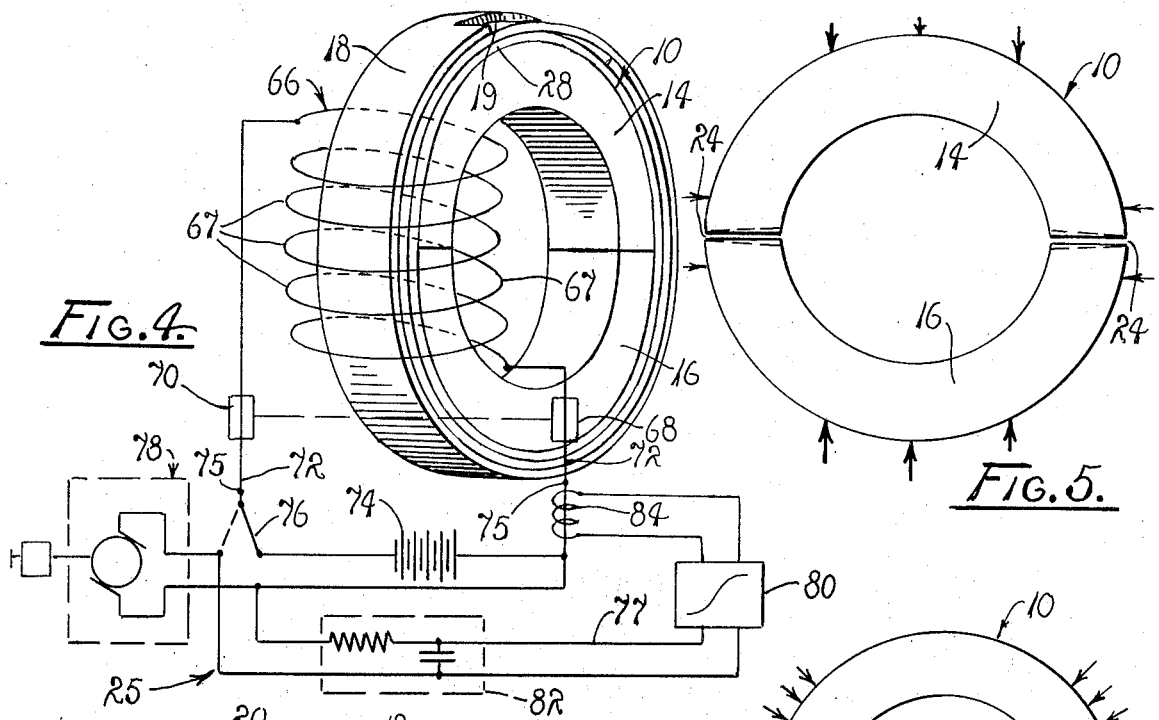
Fig.4.
Fig.5.
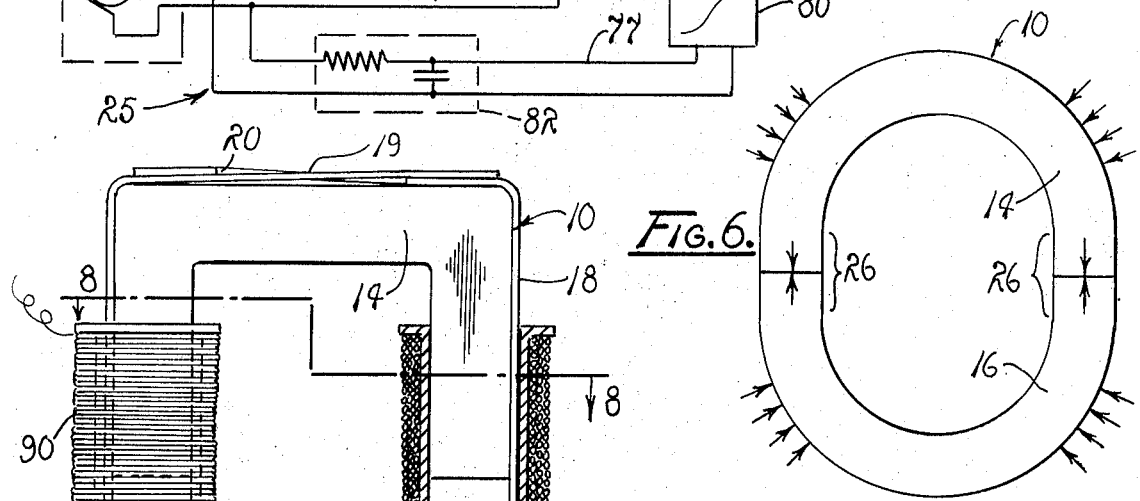
Fig.6.
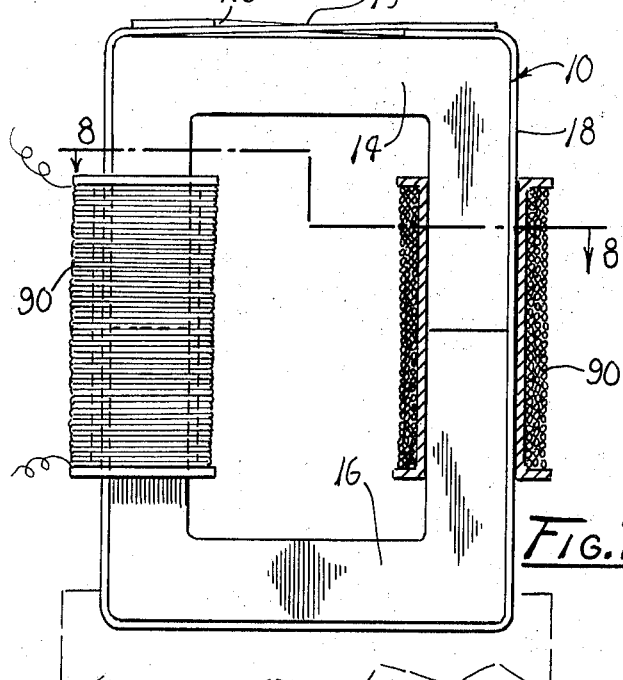
Fig.7.
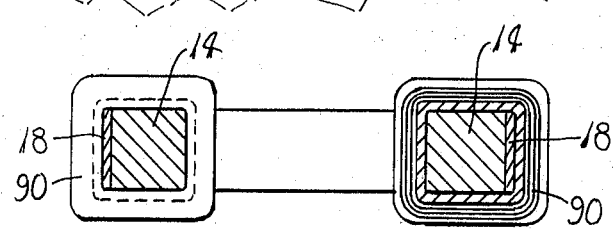
Fig.8.
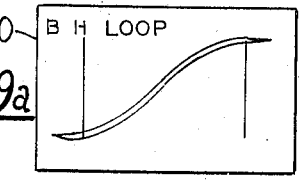
Fig.9a.
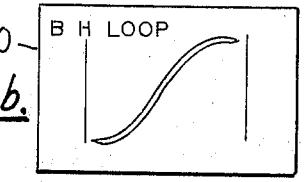
Fig.9b.
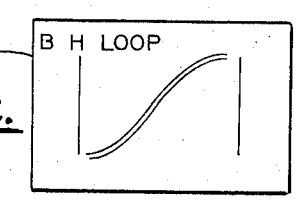
Fig.9c.

BANDED TRANSFORMER CORES

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention generally relates to transformer cores and more particularly to banded transformer cores and a method and device for providing the same.

2. Description of the Prior Art

Transformer cores are well known, therefore, a detailed description of such cores and their functions is omitted in the interest of brevity. However, it will be recalled by those familiar with the use of transformer cores that such devices have particular utility in d.c. to a.c. converters and d.c. to d.c. inverters of types often employed in various types of power systems, particularly those employed in mobile communication systems.

One inherent characteristic of transformers, which tends to impede the design thereof is residual flux density which, in operation, tends to be additive and thus often causes transformer cores to saturate. Such saturation, of course, tends to occur where an unbalance a.c. drive is employed for a transformer or where the transformer is subjected to d.c. excitation. Since a high residual flux state often remains, even after the excitation current is removed, reapplication of the excitation current in the same direction has a propensity to cause the core to saturate. As an attendant consequence, extremely large resulting current spikes may occur which, in turn, can produce catastrophic results, for readily apparent reasons.

It has been found that by introducing a small (less than 25 microns) air gap in a transformer core, as it is fabricated, saturation of the core can be avoided, since residual flux density thus is reduced. It should therefore be readily apparent that air gaps have the inherent effect of "shearing over" the B-H loop (hysteresis characteristic) of core material. Therefore, through a use of appropriately dimensioned air gaps, it is possible to provide transformer cores which will not saturate upon circuit turn-on, even when employing an unbalanced drive and/or a repeated d.c. excitation.

It is important to note that because of the nature of the material employed and the small size of the air gap introduced, extreme care and control must be taken in establishing the air gaps, otherwise the desired effect will not be achieved. Accordingly, as can readily be appreciated, the cores must be carefully cut, the severed ends thereof carefully lapped and etched to provide smooth, residue-free surfaces, and the core halves thereafter reassembled with extreme care.

Heretofore, transformer cores have been fabricated by banding prepared core halves employing straps and buckles of a type frequently employed in banding containers for shipping purposes. In such operations, the bands and buckles are employed in a manner consistent with their intended purposes. As a consequence, resulting banded cores heretofore have not satisfactorily met existing needs and have tended to be unsightly, bulky, and often impractical to use, due, in part, to the fact that the buckles employed produced large surface irregularities having sharp edges likely to damage the subsequently applied transformer windings. Furthermore, and quite importantly, compressive forces applied to the periphery of cores banded through the use of the heretofore employed banding materials, simply cannot accurately be controlled, and the banding techniques, as heretofore performed, do not accommodate a precise tensioning of the bands.

It is, therefore, a purpose of the instant invention to provide an improved banded transformer core and method and device which overcomes the aforementioned difficulties and disadvantages.

OBJECTS AND SUMMARY OF THE INVENTION

It is, therefore, an object of the instant invention to provide an improved banded transformer core.

It is another object to provide an improved method of banding transformer cores.

It is another object of the instant invention to provide a device for banding improved transformer cores.

It is another object to provide an improved banded transformer core formed of core halves and separated by air gaps of precisely controlled dimensions.

It is another object of the instant invention to provide an improved banded transformer core fabricated from a pair of mated, precisely formed core halves of a C configuration, supported by compressive forces of a predetermined magnitude, and supporting both primary and secondary transformer windings.

It is another object to provide a method of banding transformer cores, each of which includes a pair of mated, similar core halves disposed in coplanar relation, with the ends thereof abutted, and supported by an encircling, precisely tensioned strap having a substantially uniform, uninterrupted peripheral surface for receiving and safely supporting transformer windings.

It is another object to provide a device for banding transformer cores formed of a pair of abutted core halves supported by an encircling strap maintained under predetermined tension and having a substantially smooth, uniform peripheral surface for receiving in supported engagement applied transformer windings.

These and other objects and advantages are achieved through a method wherein a pair of semi-circular core halves, each being the mirror image of the other, are supported on a pedestal in an abutted, coplanar relation and united by a d.c. magnetic field, encircled by a strap precisely tensioned, by manipulating a tensioning clamp and thereafter united at a cruciform joint, by welding, for thereby forming an endless band having a substantially smooth, uniform surface circumscribing a core including precisely dimensioned air gaps, as will become readily apparent upon reference to the following description and claims in light of the accompanying drawings.

BRIEF DESCRIPTION OF THE DRAWINGS

FIG. 1 is an elevational view of a transformer core supported within a device employed in a banding operation, as it is performed in accordance with the principles of the instant invention.

FIG. 2 is a perspective view of an oblong core banded in accordance with the method of the instant invention.

FIG. 3 is a perspective view of the strap, on an enlarged scale, employed in banding the core shown in FIG. 2.

FIG. 4 is a schematic view diagrammatically illustrating circuitry employed in inducing a magnetic field about the core halves, while supported as shown in FIG. 1.

FIG. 5 is an exaggerated diagrammatic view of a toroidal core depicting resulting deformation as excessive compression is applied to the core halves.

FIG. 6 is a schematic view of an oblong core depicting resistance to deformation as compression is applied to the core halves.

FIG. 7 is a partially sectioned view of a transformer core having a substantially rectangular configuration employing a pair of core halves of a so-called C configuration.

FIG. 8 is a cross sectional view taken generally along line 8—8 of FIG. 7.

FIGS. 9a, 9b and 9c collectively provide pictorial representations of B-H loops, displayed on the face of an oscilloscope for indicating the dimensions of air gaps, as tension is applied to the strap during the final phases of the banding operation.

DESCRIPTION OF THE PREFERRED EMBODIMENT

Referring now to the drawings wherein like reference characters designate like or corresponding parts throughout the several views, there is shown in FIG. 1 a transformer core, generally designated 10, supported within a banding device, generally designated 12, as it is banded in accordance with the principles of the instant invention.

BANDED CORE

The core 10 is made up of a pair of core halves 14 and 16 of similar configurations. The core halves, of course, are fabricated from a suitable ferromagnetic material, such as a nickel-iron alloy, having a permeability greater than unity. The core halves 14 and 16 are mated with the faces of the ends thereof being abutted so that the core halves, in effect, form a core of a closed-loop configuration. In practice, the adjacent faces of the ends are polished using any suitable polishing technique including lapping and etching.

About the pair of mated core halves 14 and 16, there is an encircling strap 18. The strap 18 ultimately is united at a cruciform joint 19 formed by mating a pair of opposed notches, or reliefs 20 and 22, FIG. 2, provided along the opposite edges of the strap. In practice, the reliefs 20 and 22 extend transversely to the centerline of the strap 18 and are nested, as they are mated, in mutually received relation so that a resulting cruciform joint is formed without increasing the total width of the strap 18. As a practical matter, the end portions of the strap are superimposed on the strap and thereafter welded to the strap employing a plurality of suitably positioned spot welds, designated 23. Once welding of the strap is finalized, the banded core is substantially completed. However, as is normally desired, the opposite ends of the strap 18 are brought into an abutted relation and welded to form a butt-joint, not designated, preferably at a location in diametric opposition to the joint 19.

Banding of the cores 10, employing the principles of the instant invention, is performed while changes in the dimensions of air gaps 24, inherently existent between the polished faces of the ends of the core halves occur. The air gaps 24, of course, result from the fact that space inherently exists between the faces of the ends of the core halves.

It should, at this point, be noted that cores of a toroidal configuration are old. Furthermore, the inherent deficiencies of such cores also are well known, as hereinafter further discussed.

A core 10 of a toroidal configuration is depicted in FIG. 5. This core is formed of core halves provided by severing a circular member, whereby a de-magnetizing air gap 24 is introduced between the core halves 14 and 16. Since the core 10 is formed by severing a circular member, the core halves do not precisely conform to a semi-circular configuration, due to the removal of material during the severing and polishing processes. Consequently, as tension is applied to the strap 18, uniform pressure is applied about the peripheral surface of the core 10 for causing the air gaps 24 to close. Since the core 10 is not of a circular configuration, the applied tension causes an increase in the pressure applied to the end portions of each of the core halves resulting in deformation of the core 10, as it attempts to assume a circular configuration. As a consequence, the gaps 24 are caused to conform to a pie-shaped configuration, as indicated in dashed lines, FIG. 5. Thus, force of the applied tension tends to again separate the end portions of the core halves, whereupon an increase in the dimensions of the air gaps 24 is experienced.

It has, in practice, been found that this tendency can be overcome simply by elongating the end portions of the core halves 14 and 16 so that adjacent end portions of mated core halves establish a pair of parallel, linear sections, designated 26, FIG. 6. As depicted in FIGS. 2 and 6, the resulting core is of an oblong configuration. Consequently, as indicated by force arrows, FIG. 6, the forces acting at the interfaces of the ends of the core halves are in opposition. Therefore, substantially no deforming forces are applied to the end portions of the core halves in the vicinity of the polished faces of the ends of the core halves. Thus, the ends of the core halves are so supported as to substantially preclude formation therebetween of air gaps 24 of undesired or uncontrolled dimensions, even in the presence of substantially excessive compressive forces, applied by the band 18.

In practice, it has been found that further control in the dimensioning of the air gaps 24 can be achieved simply by utilizing a pair of arcuate spacers 28 located immediately beneath the strap 18 in the vicinity of the arcuate portions of the oblong core 10. These members are of a thickness sufficient to assure that the strap 18 does not engage the outer surfaces of the linear sections 26 with sufficient force to vary the relative positions of the ends of the core halves. Thus, where desired, it is possible to substantially eliminate the air gaps 24 in oblong cores without experiencing deformation. In instances wherein the cores are caused to expand under temperature, further control can be achieved simply by utilizing a strap 18 formed of material having a thermal coefficient approximating that of the core material.

It is important also to understand that the device 12 can readily be employed in banding the cores regardless of their ultimate configuration. Furthermore, the device 12 is particularly suited for use in fabricating transformers having both primary and secondary windings utilizing core halves of a so-called C configuration, as depicted in FIG. 7. Therefore, as should hereinafter become apparent, the described device and banding technique of the instant invention is deemed applicable for banding cores regardless of whether the resulting cores are of toroidal, oblong or substantially rectangular configurations.

Device And Method

The device 12 includes a horizontal base plate 30 which forms a base for the device. Upon the base there is mounted a pair of vertically oriented, horizontally spaced stanchions forming uprights 32. Midway between the uprights 32 there is provided a vertically oriented pedestal 34, welded or otherwise rigidly secured to the base 30 in parallelism with the pair of uprights 32. As a practical matter, the pedestal 34 includes an adjustment section 36 through which vertical adjustment of the pedestal 34 is facilitated for accommodating cores of different dimensions.

It is to be understood that the structure of the adjustment section 36 can be varied as desired, therefore, a detailed description thereof is omitted in the interest of brevity. However, as shown, the pedestal 34 includes a pair of telescoping end segments 37 which are coupled together through a threaded screw and slot assembly 38 of a suitable design. To effect adjustment of the vertical dimension of the pedestal 34, the screw of the assembly 38 is loosened and the segments 37 thereafter appropriately displaced. Ultimately, the segments 37 are secured in fixed relation by again tightening the screw. Thus, the vertical dimension of the pedestal can readily be varied for accommodating cores of different dimensions.

It is to be understood that the uppermost end surface of the pedestal 34, not designated, is shaped to conform to the configuration of the selected core half to be received thereby. Additionally, a pair of spaced support plates 40, only one of which is shown in FIG. 1, is secured to the uppermost end of the pedestal by a set-screw 42 and employed for clamping a core half therebetween. Thus, each core half received by the pedestal 34 is clamped between the plates 40 and supported in an appropriate orientation during subsequently performed portions of the banding operation.

It is to be further understood that the uprights 32 are of a similar construction, configuration, and dimension. As shown, each of the uprights 32 is provided with a strap tensioning clamp, generally designated 44, adjustably supported on the uppermost end portion thereof. Each of the clamps 44, in turn, includes a supporting base 46 having a threaded opening, not designated, for receiving in threaded engagement an anchor bolt 48. This bolt preferably is extended through a vertically oriented slot 50 which accommodates vertical adjustment of the clamp 44.

It therefore can readily be appreciated that the vertical position of the base 46, relative to the upright, is dictated by the position assumed by the base at the time the anchor bolt 48 is torqued to a "snug fit" for effecting a locking of the base with the upright 32. Therefore, the vertical position of each of the tension clamps 44 can be varied simply by loosening the bolt 48 and repositioning the base 46, prior to again tightening the bolt.

To the distal end of each base 46 there is pivotally coupled a tensioning arm 52. The arm 52 preferably is pinned to the base by a suitable bearing pin 54 extended through axially aligned openings, not designated, formed in the adjacent ends of the base 46 and the arm 52. Hence, the base 46 and the arm 52, in effect, form an articulated tensioning member through which tension can selectively be applied to the strap 18.

At the distal end of each of the arms 52 there is provided a strap lock 56 through which the end portion of the strap is affixed to the arm. As a practical matter, each strap lock 56 includes a pivotally supported clamping cam 58 supported for oscillation within a slot, not designated, formed in the distal end of the arm. The cam 58 is shaped to engage the strap 18 in a manner such that an extracting motion imparted to the strap 18 serves to draw the pivotally supported clamping cam 58 into an even tighter frictional engagement within the strap. Thus the adjacent portion of the strap 18 is "pinched" against the opposed surface of the slot through which the strap is extended. Of course, a reverse motion imparted to the pivotally supported clamping cam 58 serves to release the strap 18 so that it can readily be withdrawn. Since such locks are well known, a more detailed description of the strap lock 56 is omitted.

In order to impart pivotal displacement to the arms 52, about the pins 54, each of the uprights 32 is provided with a plurality of vertically aligned screw-threaded openings 60 which receive in threaded engagement a screw-threaded stud 62. This stud, in turn, extends through an opening, not designated, formed within the arm 52 so that appropriately applied torque causes the stud to be advanced into the opening 60, whereby the arm 52 is responsively displaced about the bearing pin 54.

As a practical matter, a compression spring 64 is interposed between the arm 52 and the upright 32 for pivotally displacing the arm 52 as the stud 62 is torqued in a direction such that it threadedly is extracted from a receiving opening 60.

It has, in practice, been found that where cores of very small dimensions are banded employing the device 12, difficulty may arise in maintaining the selected core halves in a mated relationship, particularly during the initial phases of the banding operations. For overcoming this difficulty, there is provided a magnetizing unit, generally designated 66, which serves to establish a d.c. magnetic flux field about the core halves 14 and 16, once the core halves have been mated, so that the core halves are magnetically united as they are received by the pedestal 34, between the plates 40. Of course, the strap 18 is arranged in a circumscribing relationship with the core halves as they are seated, and prior to a clamping of the core halves between the plates 40.

In practice, the magnetizing unit 66 includes a multitude of individual, insulated wires 67. The wires 67 terminate in a pair of junction blocks 68 and 70. In practice, the wires are looped through the core 10 and electrically excited by a d.c. current for establishing a d.c. magnetic field about the core halves. The core halves, of course, are caused to unite in mutual adherence as a consequence of the effects of the thus established magnetic field.

As diagrammatically illustrated, in FIG. 4, the pair of blocks 68 and 70 include female receiver and male connector pins, not designated, which when united maintain the unit 66 in a closed-loop configuration. A pair of electrical leads 72 are coupled with the wires 67 through a suitable bus bar provided within the junction blocks 68 and 70. These leads are extended and coupled within a suitable d.c. magnetizing circuit 73.

As shown, the circuit 73 includes a d.c. source of electrical potential 74 and a manually operable switch 76 through which the unit 66 is coupled with the source 74. As can readily be appreciated by those familiar with the establishment of magnetic fields, a d.c. flux field is established about the core halves 14 and 16 as a d.c. current is simultaneously passed through the multitude of wires 67 for thus causing the core halves 14 and 16 to be clamped into a mutually dependent, substantially rigid configuration. With the core halves 14 and 16 so clamped, the end portions of the strap 18 can readily be inserted and locked within the strap locks 56. Hence, the utility of the d.c. magnetic field has particular utility during the final phases of the positioning of the core halves of the core 10 as well as for supporting the core 10 as the strap 18 is adjusted.

It is, of course, to be understood that the unit 66 is coupled with the circuit 73 through suitable junction terminals, designated 75, FIG. 4.

Once the core 10 and the strap 18 are appropriately assembled and supported at the uppermost end of the pedestal 34, between the plates 40, the switch 76 is opened between the source 74 of d.c. potential and the lead 72 so that the d.c. excitation is removed from the core 10.

As the switch 76 is opened to the circuit 73, an electrical circuit is prepared to be closed to a monitoring circuit 77. This circuit includes a source 78 of a.c. electrical potential and an oscilloscope 80. In practice, the source 78 is a power oscillator having a variable output.

The function of the monitoring circuit 77 is to provide a continuous B-H loop display on the screen of the oscilloscope 80, which is indicative of the dimensions of the air gaps 24 established between the adjacent ends of the core halves 14 and 16, as the strap 18 is tensioned by displacing the arms 52 of the clamps 44.

It is to be understood that the monitoring circuit 77 forms no specific part of the instant invention and is deemed to be well within the purview of the art. Therefore, a detailed description of the circuit 77 is omitted. However, as shown in FIG. 4, the circuit 77 preferably includes a voltage integrator 82 and a current detector 84 which are, in turn, coupled with suitable drive circuits, of known design, employed in driving the oscilloscope 80.

As will be appreciated by those familiar with such circuitry, a B-H loop can be displayed when driving the oscilloscope 80 in a manner such that the display of the B-H loop "lays over," as indicated in FIG. 9a, when the air gaps between the ends of the core halves are of excessive dimension, but caused to approach a vertical orientation, as depicted in FIGS. 9b and 9c, as the dimensions of the air gaps 24 are reduced. This results from the fact that a reduction in the dimensions of the air gaps 24, between the faces of the adjacent ends of the core halves 14 and 16 initiates an increase in the circuit impedance and thus initiates a reduction in the amperage of the current flowing in the unit 66.

Of course, as the strap 18 is tensioned, the electrical current derived from the source 78, operating at a given output voltage and flowing through the wires 67, is reduced. However, where a toroidal core 10 is being banded, excessive tension tends to initiate deformation of the core for introducing between the faces of the ends of the core halves air gaps 24 of a pie-shaped configuration. These air gaps, of course, tend to magnify in the presence of elevated temperature.

As a practical matter, a torque wrench 86, as shown in phantom lines in FIG. 1, can be employed for torquing the studs 62 to achieve the desired tension within the strap 18. Therefore, the torque required for tensioning the straps 18 can empirically be determined, whereupon use of the monitoring circuit 77 be reduced and/or even eliminated in banding selected cores.

As a practical matter, once the strap 18 has been precisely tensioned, the overlying segments of the strap are spot-welded, as aforementioned, for securing the strap in a tensioned condition about the periphery of the core. The studs 62, of course, can be released immediately following the welding step. If desired, the strap ends are welded in a butt-joint, not designated, located in diametric opposition to the cruciform joint 19.

In addition to banding cores, the device 12 also has particular utility in fabricating transformers of a type fabricated from core halves, each being of a C configuration, supporting adjacent winding-bearing bobbins 90, arranged in spaced parallelism.

As illustrated in FIGS. 7 and 8, in fabricating such a transformer, a pair of core halves 14 and 16, each being of a C configuration, are provided. A pair of previously wound bobbins 90 are positioned to receive within the opposite ends thereof the adjacent ends of the core's halves 14 and 16, as the ends thereof are brought into an abutting engagement within the bobbins. Thus, each of the bobbins receives within its opposite ends a linear segment of a pair of core halves. In this configuration, a strap 18 is extended about the periphery of the core 10, and passed internally through the bobbins 90, so that the strap, in effect, is sandwiched between the adjacent surfaces of the bobbins 90 and core 10. The strap 18 is then tensioned and secured by welding, as in the manner aforedescribed.

OPERATION

It is believed that in view of the foregoing description, the operation of the device will be readily understood and it will be briefly reviewed at this point.

With the devcie 12 assembled and adjusted, as hereinbefore described, a pair of core halves 14 and 16 of a core 10 are positioned and supported at the uppermost end of the pedestal 34. These core halves are then secured in place utilizing the plates 40 fixed to the pedestal.

It is to be understood that while the device 12 can be employed in banding cores of a toroidal configuration, an even more effective core 10 can be fabricated employing the device 12 utilizing core halves so configured as to include a pair of linear sections 26 so that the resulting core 10 is caused to conform to an oblong shape. Such a core is less likely to deform under compression and therefore less likely to develop air gaps 24 of a pie-shaped configuration between the adjacent faces of the ends of the core halves 14 and 16. Additionally, in instances where increased rigidity in core configuration is desired, a pair of spacers 28 circumscribing the arcuate portions of the core 10 is interposed beneath the strap 18 so that the strap does not apply a radially directed deforming pressure against the linear surfaces of the core halves in the vicinity of the interface of the abutted core ends.

With the core halves 14 and 16 thus assembled and supported at the uppermost end of the pedestal 34, the opposite ends of the strap 18 are extended through the strap locks 56 and secured in place, as the reliefs 20 and 22 are mated in a mutually-received relationship.

At this point, the magnetizing unit 66 is passed through the assembled core 10 and the blocks 68 and 70 brought into a mated relationship. The external leads 72 of unit 66 are then coupled with the magnetizing circuit 73 so that final adjustment of the strap 18, and the positioning of the core 10, is facilitated as a supporting magnetic field is established about the core halves. Once the final adjustment of the strap and core is achieved, the switch 76 is opened to the circuit 73 and closed to the monitoring circuit 77. The core 10 is thus prepared for receiving the final steps of the banding operation.

Accordingly, the studs 62 are torqued so that tension is applied to the strap 18. As tension within the strap 18 increases, for reducing the dimensions of the air gap 24, the B-H loop displayed on the face of the oscilloscope 80 is caused to approach a vertical orientation. Of course, as the tension is increased, a corresponding reduction in the air gaps between the adjacent ends of the core halves is experienced. Once the tension within the strap is sufficient to suitably reduce the dimensions of the air gaps between the core halves, as indicated by the orientation of the B-H loop, a spot-welding of the strap, adjacent to the cruciform joint 19, is performed employing suitable techniques. Thus, banding of the core 10 is completed. In practice, however, the opposite end portions of the strap 18 are brought into an abutted relationship to thus establish a butt-joint located in diametric opposition to the cruciform joint 19, whereupon the strap 18 is again welded.

It is to be further understood that the aforementioned statement of operation also applies in instances where the device 12 is utilized in fabricating transformers which include wound bobbins 90 supported in spaced parallelism on cores 10 formed of C-core core halves.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A banded tranformer core comprising:
   A. a pair of similar core halves of a selected configuration disposed in coplanar relation with the ends thereof being abutted to form a core of a closed-loop configuration;
   B. an endless strap encircling said core and applying a compressive force of a predetermined magnitude to the periphery of the core, said strap having means defining along opposite edges thereof a pair of longitudinally spaced, outwardly directed notches disposed in mutually-received relation defining a cruciform joint; and
   C. means adjacent to said joint uniting said strap.

2. The core of claim 1 wherein said means uniting said strap includes means defining a weld.

3. The core of claim 1 wherein each of said core halves includes an intermediate segment, and the intermediate segments of said pair of core halves are oriented in diametric opposition.

4. The core of claim 3 wherein each intermediate segment terminates in a pair of mutually spaced linear segments, whereby said core conforms to an oblong configuration having a pair of mutually spaced linear segments arranged in substantial parallelism.

5. The core of claim 3 wherein each intermediate segment is of an arcuate configuration and said core further comprises a spacer of an arcuate configuration interposed between said strap and the adjacent surface of each of said intermediate segments.

6. A banded transformer core of an oblong configuration comprising:
   A. a pair of mated core halves, each core half being shaped to conform to a U-shaped configuration having a pair of linear end segments arranged in substantial parallelism and an intermediate segment of an arcuate configuration joining said pair of end segments, each of said end segments including a substantially planar face disposed in an abutted contiguous engagement with an adjacent face of an end segment; and
   B. a continuous, tensioned strap encircling said core wherein said strap is united at a cruciform joint including means defining a pair of oppositely directed, mutually received openings formed in said strap, and a weld securing over-lapped portions of said strap, one to the other.

* * * * *